United States Patent
Das

(10) Patent No.: US 11,947,816 B1
(45) Date of Patent: Apr. 2, 2024

(54) SOLID STATE DRIVES WITH IMPROVED FORMAT HANDLING

(71) Applicant: Kioxia Corporation, Tokyo (JP)

(72) Inventor: Saswati Das, Milpitas, CA (US)

(73) Assignee: Kioxia Corporation, Tokyo (JP)

( * ) Notice: Subject to any disclaimer, the term of this patent is extended or adjusted under 35 U.S.C. 154(b) by 15 days.

(21) Appl. No.: 17/948,013

(22) Filed: Sep. 19, 2022

(51) Int. Cl.
*G06F 3/06* (2006.01)

(52) U.S. Cl.
CPC .......... *G06F 3/0632* (2013.01); *G06F 3/0604* (2013.01); *G06F 3/065* (2013.01); *G06F 3/0679* (2013.01)

(58) Field of Classification Search
CPC .... G06F 3/0632; G06F 3/0604; G06F 3/0679; G06F 3/065
See application file for complete search history.

(56) References Cited

U.S. PATENT DOCUMENTS

| | | | | |
|---|---|---|---|---|
| 11,520,484 | B2 * | 12/2022 | Frolikov | G06F 3/0607 |
| 2018/0121344 | A1 * | 5/2018 | Seo | G06F 12/0246 |
| 2020/0089619 | A1 * | 3/2020 | Hsu | G06F 3/0604 |
| 2023/0333988 | A1 * | 10/2023 | Tian | G06F 12/1009 |

* cited by examiner

*Primary Examiner* — Mark A Giardino, Jr.
(74) *Attorney, Agent, or Firm* — Allen & Overy LLP

(57) ABSTRACT

A method performed by a controller of a solid-state drive (SSD) comprising receiving a command from a host, the command identifying a namespace in a non-volatile semiconductor memory device of the SSD to be formatted, identifying a plurality of regions in the non-volatile semiconductor memory device corresponding to the namespace, unmapping a dummy region in a volatile semiconductor memory device of the SSD using invalid addresses, and copying the invalidated dummy region to each region of the plurality of regions of the namespace.

30 Claims, 5 Drawing Sheets

SOLID STATE DRIVES WITH IMPROVED FORMAT HANDLING

FIELD

The present disclosure relates to solid-state drives (SSD) and methods for formatting an SSD that adopts a process of copying a section of invalid addresses across at least a portion of the mapping table for the drive to be formatted to significantly decrease the time for formatting the drive.

BACKGROUND

A solid-state drive (SSD) generally has faster performance, is more compact, and is less sensitive to vibration or physical shock than a conventional magnetic disk drive. Given these advantages, SSDs are being used in more and more computing devices and other consumer products in lieu of or in addition to magnetic disk drives, even though the cost-per-gigabyte storage capacity of SSDs is significantly higher than that of magnetic disk drives. SSDs utilize physical memory cells that comprise non-volatile semiconductor storage devices, such as NAND memory devices, to store data. A controller is used in an SSD to manage the transfer of data between a host and the memory cells of the SSD. Writing data to and reading data from the physical memory cells of an SSD typically involves transferring data between a host external to the SSD and the nonvolatile semiconductor storage devices. The host may also issue a format command to recalibrate the SSD for use.

SSDs are subject to large volumes of data traffic as they receive multiple read and write requests from the host. The SSD may also receive a format or deallocate command from the host when certain portions of the non-volatile memory are no longer required during use. SSDs store data at a physical address in the non-volatile memory referred to by one or more logical addresses (for example, LBAs) by the host and the SSD controller. The SSD controller identifies groupings of data of a particular size as data clusters (for example, a number of logical blocks). An LBA received from the host can be converted by the controller to a logical cluster address (LCA) referring to a cluster of data in the non-volatile memory that, in turn, corresponds to a physical media cluster address (MCA) on the memory device. Typically the SSD controller divides the MCA-LCA mapping table into regions for better management, where each region addresses a chunk of user data (e.g. 256 KB or 64 LCA, where each LCA addresses 4 KB of user data). The MCA-LCA mapping table for an SSD is very large, approximately 1/1000th of the capacity of the SSD, and is stored in the non-volatile semiconductor storage device. For example, a 1 GB mapping table would be required to manage a 1 TB drive, a 2 GB mapping table would be required to manage a 2 TB drive, a 4 GB mapping table would be required to manage a 4 TB drive, and a 16 GB mapping table would be required to manage a 16 TB drive. In order for the SSD to update or unmap a region of the non-volatile semiconductor storage device that is subject to a host format command, the mapping table is loaded into volatile memory within the SSD for fast access.

Format or deallocation commands from the host, as well as internal processing within the SSD (such as garbage collection, power loss protection (PLP) activities) result in changes to the addresses stored in the mapping table. The SSD cache updates the mapping table in the volatile memory during processing of a host request. Such updates may include unmapping of at least a few regions (or all of the regions) of the non-volatile memory that the host requires to be formatted. The entire updated mapping table is then written to the non-volatile semiconductor storage device periodically so that the changes in the mapping table are saved before power to the volatile memory is lost. However due to the large size of the mapping table, such updates may lead to increased latency of the SSD due to the writing of large amounts of data from the volatile to the non-volatile semiconductor storage device. Additionally, repeated deallocation or formatting of entries in the mapping table will lead to repeated writing of unmapped data to the non-volatile semiconductor storage device leading to increased write amplification of the SSD. Other processes such as garbage collection, journaling, and flushing, that routinely occur within the SSD will also require updates to the mapping table. If such updates are not stored in the non-volatile semiconductor storage device before power is lost, updated address information may be lost, leading to errors and possibly failure of the SSD. This imposes a challenge on how to efficiently manage updates of a logical-to-physical mapping table when the non-volatile semiconductor storage device is formatted.

SUMMARY

The present disclosure provides a solid-state drive that efficiently formats the drive such that the time taken to format the drive is reduced from that taken by conventional drives by more than 11 times. According to an embodiment of the present disclosure, there is provided a method performed by a controller of a solid-state drive (SSD) comprising receiving a command from a host, the command identifying a namespace in a non-volatile semiconductor memory device of the SSD to be formatted, identifying a plurality of regions in the non-volatile semiconductor memory device corresponding to the namespace, unmapping a dummy region in a volatile semiconductor memory device of the SSD using invalid addresses, and copying the invalidated dummy region to each region of the plurality of regions of the namespace.

According to another embodiment of the present disclosure there is provided an SSD comprising a non-volatile semiconductor memory device comprising a plurality of regions, a volatile semiconductor memory device comprising a dummy region, and a controller coupled to the non-volatile semiconductor memory device and the volatile semiconductor memory device. Here the controller is configured to receive a command from a host, the command identifying a namespace in a non-volatile semiconductor memory device of the SSD to be formatted, identify a plurality of regions in the non-volatile semiconductor memory device of the SSD corresponding to the namespace, unmap the dummy region in the volatile semiconductor memory using invalid addresses, and copy the invalidated dummy region to each region of the plurality of regions of the namespace.

In some implementations, the method further comprises disabling a read-modify-write operation of the controller during the copying. In certain implementations, determining if a discontinuity in namespace allocation units (NSAUs) comprising the namespace exists, and copying the region corresponding to the discontinuity with the read-modify-write operation enabled if the discontinuity exists. In other implementations, the copying is performed using an aligned-to-packed copying procedure. In further implementations, unmapping the dummy region using the invalid addresses is done using a memset operation. In some implementations, the invalid addresses are predetermined. In some implementations, the method further comprises storing in a logical to physical mapping table of the non-volatile semiconductor memory a plurality of logical cluster addresses (LCAs) corresponding to each region.

In certain implementations, the method further comprises storing the logical to physical mapping table in the volatile semiconductor memory device during execution of the format command. In other implementations, the dummy region may be located in an aligned portion of the volatile semiconductor memory device. In further implementations, the method further comprises flushing regions of the logical to physical mapping table that have changed via copying to the non-volatile semiconductor memory device after the namespace is formatted. In some implementations, the method further comprises flushing a media zone address table (MZAT) to the non-volatile semiconductor memory device after the namespace is formatted, each entry in the MZAT corresponding to a media zone address (MZA) of a zone comprising a subset of the plurality of regions within the namespace. In certain implementations, the method further comprises clearing a deallocate flag bitmap (DFB) associated with the namespace. The DFB consists of two bits per region, the pair of bits cleared to '00' to indicate a region which has been unmapped using the invalid addresses.

In further implementations, the method further comprises flushing a deallocated flag address table (DFAT) to the non-volatile semiconductor memory device after the namespace is formatted, each entry in the DFAT corresponding to a media zone address in the non-volatile semiconductor memory device at which the DFB for each zone is stored, the DFB for each zone comprising 2×1024=2048 bits=256 bytes. In some implementations, the volatile semiconductor memory device comprises a cache memory for temporarily storing the logical to physical mapping table. In other implementations, the method further comprises creating and storing a two dimensional valid cluster count (VCC) table per namespace per superblock for the non-volatile semiconductor memory device, the table stored in the non-volatile semiconductor memory device. In some implementations, the method further comprises resetting the VCC for the formatted namespace to zero after completing the format command.

In other implementations, the method further comprises loading the MZAT and DFAT from the non-volatile semiconductor memory device into the volatile semiconductor memory device on boot-up after a power cycle following the format command, inspecting the MZAT and DFAT for entries containing invalid addresses, loading mapped zones of the non-volatile semiconductor memory device corresponding to MZAT entries having valid addresses into the MRAT in the volatile semiconductor memory device, and skipping zones and DFBs of the non-volatile semiconductor memory device corresponding to MZAT and DFAT entries respectively having invalid addresses. The method further comprises loading mapped regions of the non-volatile semiconductor memory device corresponding to MRAT entries having valid addresses into the logical to physical address mapping table in the volatile semiconductor memory device and skipping regions of the non-volatile semiconductor memory device corresponding to MRAT entries having invalid addresses.

In some implementations, the command identifies all namespaces in the non-volatile semiconductor memory device of the SSD to be formatted. In certain implementations, the non-volatile semiconductor memory device is a NAND semiconductor memory. In other implementations, the volatile semiconductor memory device is a Dynamic Random Access Memory (DRAM).

BRIEF DESCRIPTION OF DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION

Figure 1:
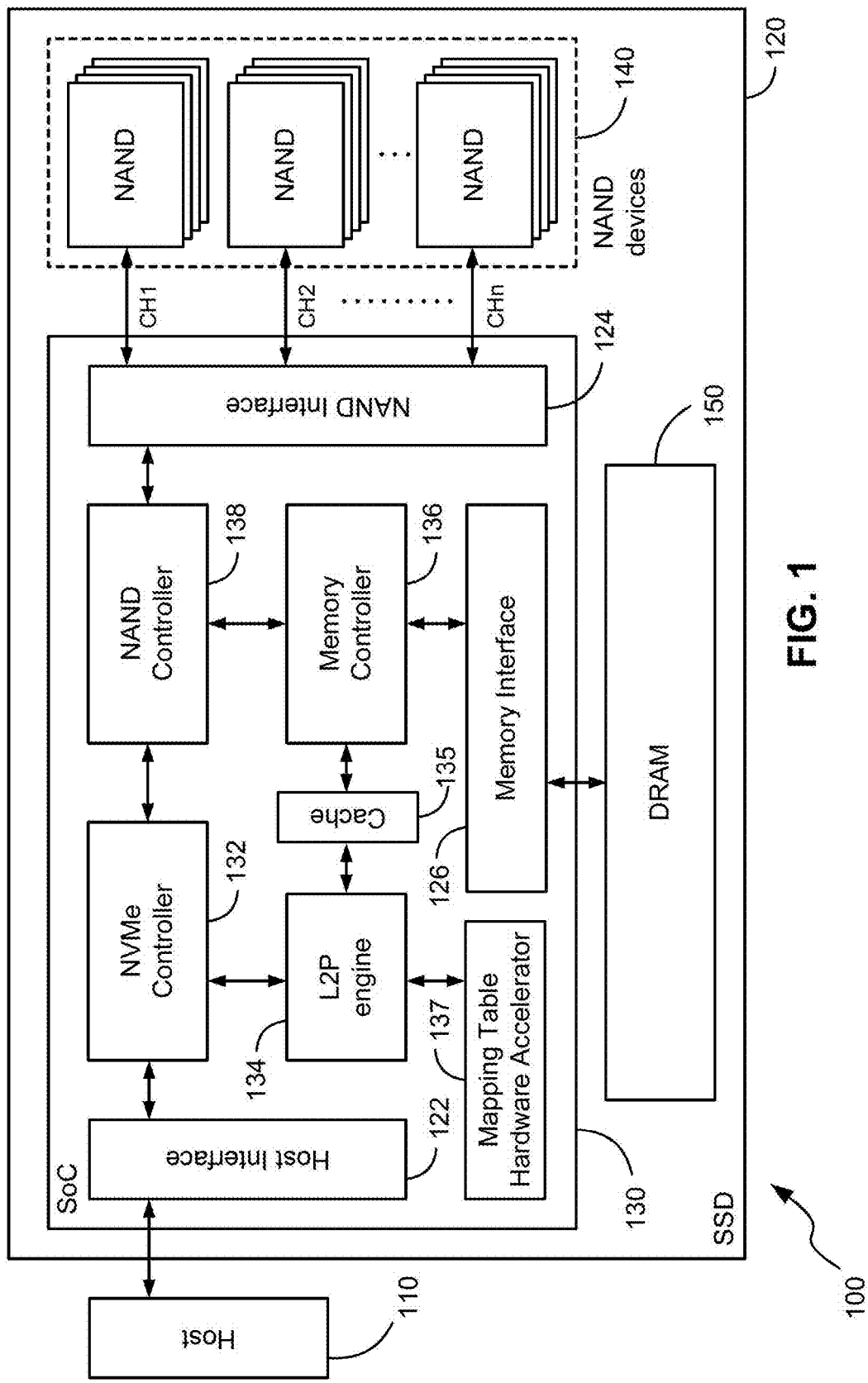
FIG. 1 shows a schematic representation of an SSD, configured according to one or more embodiments of the present disclosure.

To provide an overall understanding of the devices described herein, certain illustrative embodiments will be described. Although the embodiments and features described herein are specifically described for use in connection with an SSD having a controller, it will be understood that all the components and other features outlined below may be combined with one another in any suitable manner and may be adapted and applied to other types of SSD architectures with memories having a similar need to decrease the time taken to format an SSD.

Hitherto, the non-volatile memory of the SSD (e.g. NAND flash memory devices) stores a logical cluster address (LCA) to a media cluster address (MCA) mapping table in regions. Each entry in the mapping table includes a MCA which corresponds to a translation between an LCA and an MCA, and when data at an LCA is over-written with new data by the host, the new data is written to a new MCA, necessitating an update to the corresponding mapping table entry. Additionally, when data is no longer required in the non-volatile memory, the host issues a deallocate or format command to the corresponding LCA range. A format command received from a host may identify a namespace of the SSD, or the entire SSD, to be formatted. In response controller deallocates the relevant entries, or all the entries, in the mapping table where an invalid signature address is stored. During processing of host commands, if the corresponding mapping table region is not already loaded as part of background table loading, the SSD controller loads the LCA-MCA mapping table stored in the non-volatile memory of the SSD to a volatile memory in the SSD (e.g. Dynamic Random Access Memory (DRAM)) for quick access by the cache (e.g. Static Random Access Memory (SRAM)). Each read access to the LCA-MCA mapping table in the volatile memory comprises a DRAM burst of data which is temporarily stored in a cache.

After being updated by the controller, any updates to entries in the LCA-MCA mapping table in the DRAM are subsequently flushed back to the NAND memory so that the updated LCA-MCA mapping table will be available should power be cut from the SSD (where the DRAM and SRAM will lose data). It should be noted that the logical to physical mapping table may be stored in several formats: (i) the aligned format where the logical to physical mapping table region is aligned to Error Correction Code (ECC) frames of the non-volatile semiconductor memory device, (ii) the packed format where logical to physical mapping table regions are economized on space in the volatile memory and does not align with the ECC frames, and (iii) an alignment convention that is a mix of (i) and (ii). However for optimizing the volatile memory space, the logical to physical mapping table is always stored in a packed format in the volatile memory space. It is converted to an aligned format before storing the regions in the non-volatile memory because the Direct Memory Access (DMA) engine and the central processing unit (CPU) in the controller can access the regions only if it is in aligned format.

In order to limit the amount of data flushed per update, the flushes are conducted on a per-region basis, where a region consisting of a group of 32, 64 or 128 LCA-MCA entries (which may be configurable and dependent on the total storage size of the SSD) is flushed at any one time. In some SSD hierarchies, the address of each region is stored in a separate table, such as a Mapping Region Address Table (MRAT), for accessing a range of MCAs of a region as a unit.

Further, the SSD may divide the MCA-LCA mapping table into zones for better management, each zone comprising 1024 regions for accessing a range of MCAs of a zone as a unit, and a Media zone address table (MZAT) is stored. The MCA-LCA mapping table, MRAT and MZAT are root tables that are used by the SSD to manage data, depending on the granularity required for an operation. These root tables are updated in the volatile memory when the SSD is in use, and are flushed to the non-volatile semiconductor storage periodically, and during safe shut down.

During the flush of data from the DRAM to the NAND memory, entire regions containing updates are copied over to the NAND memory. Such operations may involve the transfer of large mapping tables that contain valid and invalid entries between the DRAM and NAND memory which will leads to write amplification, an increase in latency, a decrease in sequential and random write performance in workloads involving deallocate or format processes. Further, since invalid or unmapped entries are being saved to the NAND memory, the entire mapping table will have to be restored each time during boot up (or PLP boot as the case may be) leading to an increase in time to ready and more time to achieve full throughput.

The SSD may maintain a pair of bits as a deallocate flag bitmap (DFB) that corresponds to each entry in the MRAT. The purpose of the DFB is to indicate the unmapped status of the regions. The mapping table is initialized to invalid MCAs during boot and subsequently actual regions are loaded from NAND as part of background table loading. According to the present disclosure, the mapping table is divided into regions of 64 LCAs (i.e. 256 bytes) each, or zones of 1024 regions each, where a pair of bits of the DFB is assigned to each region. The DFB comprises two bits per region that is set to '11' to indicate that the mapping table region is deallocated and needs to be completely unmapped, and thus does not contain any valid MCA. The pair of bits is cleared to '00' to indicate that the mapping table region has already been unmapped or some of the LCAs have been written by the host and so the region contains valid MCAs. In other words the pair of bits is used as a placeholder to indicate the background deallocation status of the region. When a zone forms part of namespace that is to be formatted, the controller sets an invalid address to an entry in the MZAT corresponding to the zone, and clears the DFB bits belonging to the zone and writes an invalid address in the DFAT entry associated with the DFB zone, as described below. During regular mapping table saving and flush, only mapping table regions which contain valid MCAs are saved to the NAND memory. During regular flush the updated MZAT and DFAT tables with invalid addresses corresponding to formatted entries are also saved to the NAND memory 140. This significantly reduces the write amplification since the DFAT and MZAT are very small tables compared to the sized of the LCA-MCA mapping table (4 bytes versus 256 KB (256 bytes×1024 entries) to represent a zone of the mapping table).

FIG. 1 is a block diagram of a computing system 100 comprising at least one host 110 in communication with a solid-state device (SSD) 120, according to an embodiment of the present disclosure. The host 110 is a computing system that comprises processors or cores, a controller, a memory, and other components as is generally known in the art, and which are not shown in FIG. 1 for the sake of brevity. SSD 120 provides non-volatile storage functionality for use by the host 110. SSD 120 may include an integrated circuit comprising a controller. Such an integrated circuit may also be referred to as a system-on-chip (SoC) controller 130. SoCs are advantageous in SSDs as they provide a single integrated circuit that contains all the required circuitry and components of the electronic system required for the SSD to function. The SoC therefore eliminates the need for a modular discrete component architecture connected by a plurality of busses and buffers.

SoC controller 130 is communicatively coupled to a storage array of non-volatile semiconductor-based storage devices 140 (such as NAND-based flash memory devices) as the storage medium. The storage medium may comprise a plurality of NAND devices, such as, for example, 32, 64, 128, 256 separate NAND devices, and each NAND device can be running separate commands on individual dies (not shown) within the device. As an example, the storage array 140 comprising n NAND devices each with d dies may be servicing up to (n×d) commands from the SoC controller 130 at any one time, where n and d are integers greater than zero. SSD 120 also includes a volatile memory external to the SoC controller 130, such as a dynamic random access memory ("DRAM") 150. DRAM 150 comprises several buffers (not shown) used to buffer data during read and write operations between the host 110 and the storage devices 140 upon receipt of commands from the host 110.

Volatile memories are used in connection with the controller as they are fast and responsive. However, the contents stored in volatile memories are lost when power is removed. Volatile memories are also expensive, and thus increase the overall cost of the SSD. In some implementations, the whole or a part of the external memory DRAM 150 may be located within the SoC controller 130. When located within the SoC controller 130, at least a portion of the external memory may be implemented using a fast memory technology, such as static random access memory (SRAM). In some implementations, the portion of the DRAM located within the SoC 130 may be implemented as a cache 135. In certain implementations, the whole or a part of the external memory may be implemented using a fast non-volatile memory technology, including, but not limited to, magnetic random access memory (MRAM), resistive random access memory (ReRAM) or phase change memory (PCM). The controller 130 may also include a Direct Memory Access (DMA) engine, and a central processing unit (CPU), as is typical in memory devices.

SoC controller 130 comprises a host interface 122 which enables communication with the host 110 for the receipt of commands such as read, write, and deallocate and format requests, for example. SoC controller 130 also includes a NAND interface 124 for communication with the storage elements 140 (through a plurality of channels such as NAND channels CH1, CH2 . . . CHn as shown in FIG. 1, where n is an integer), and a memory interface 126 for communication with the memory 150 external to the SoC. Host interface 122 on the SoC 130 may comprise a Serial Advanced Technology Attachment (SATA) connector or a NVMe™ connector (NVMe™ is an acronym for "NVM express," where "NVM" stands for non-volatile memory, hereinafter NVMe) operating with a PCIe® ("Peripheral Component Interface Express," hereinafter PCIe) bus, for example. NAND interface 124 may comprise an Open NAND Flash Interface (ONFI), a toggle NAND interface or a manufacturer's proprietary interface, for example. Memory interface 126 may comprise, for example, an interface according to, but not limited to: a Double Data Rate (DDR) memory bus standard such as DDR3, DDR4 or DDR5; a Low Power Double Data rate (LPDDR) memory bus standard such as LPDDR3, LPDDR4 or LPDDR5; a Hybrid Memory Cube (HMC) memory bus standard.

SoC controller 130 may comprise various internal sub-controllers such as an NVMe controller 132 coupled to the host interface 122, a memory controller 136 coupled to the memory interface 126 via a cache 135, and a NAND controller 138 coupled to the NAND interface 124. The NVMe controller 132 may be configured to function in accordance with the NVM Express™ Base Specification (version 1.4) dated Jun. 10, 2019, hereinafter referenced as "NVMe 1.4." The NVMe controller 132, L2P engine 134, Mapping Table Hardware Accelerator (MTHA) 137, NAND controller 138 and Memory Controller 136 are interconnected by a common bus and controlled by a control and configuration function (not shown) of the SoC controller 130, which configures and controls the operation and the passing of data between the controllers 132, 136, 138. The MTHA 137 manages the aforementioned root tables MRAT, MZAT, DFAT. Memory controller 136 is connected to the DRAM 150 via the memory interface 126. Memory controller 136 is also coupled to the NVMe Controller 132, NAND controller 138 and to the L2P engine 134 and MTHA 137 via the cache 135. NAND controller 138 is connected to the NAND interface 124 for communication with the storage elements 140, as is shown in FIG. 1. Thus, any interaction between the DRAM 150 and the NAND storage elements 140 occurs via the memory interface 126, cache 135, the memory controller 136, the NAND controller 138 and the NAND interface 124. Additionally, memory controller 136 is in communication with the NVMe controller 132, the logical-to-physical (L2P) engine 134 and MTHA 137. In some implementations, the L2P engine 134 is also implemented in the control and configuration function of the SoC controller 130.

The control and configuration function may comprise application specific integrated circuit (ASIC) logic that is programmable, programmable firmware running on one or more processors or a combination of both. The control and configuration function may comprise the logical-to-physical (L2P) engine 134 and the MTHA 137 that translates logical address information specified in a command (such as a format command) received from the host 110 into physical address information related to the NAND memory 140. The control and configuration function may comprise a flash translation layer (FTL) that enables the SoC controller 130 to perform various activities that facilitate the processing of commands received from the host 110. One such activity may include the orchestration of the data flow between the NVMe controller 132 and the NAND controller 138 during execution of format or deallocate commands.

Once the NVMe controller 132 receives commands from the host 110, such as format or deallocate commands, for example, the L2P engine 134 and the MTHA 137 in the control and configuration function maps the logical block addresses contained in the host commands to physical NAND addresses. The L2P engine 134 may utilize a look-up table contained in the cache 135 and/or the DRAM 150 to obtain the required NAND addresses. These NAND addresses are then used in NAND commands, either based on the host commands received or internally generated by firmware, which are sent to the NAND controller 138. The NAND controller 138 uses the NAND addresses to then perform an action or function on the memory device 140, as defined by the host or internal command. For example if the host command is a format command, the controller identifies the LCA range corresponding to a namespace to be formatted and proceeds to unmap the corresponding regions of the NAND devices 140. Eventually the data corresponding to the formatted LCAs are erased in the NAND devices 140. As another example, a garbage collection activity may be internally performed by the control and configuration function within the SoC controller 130 causing multiple read, write and erase NAND commands to be issued to the NAND controller 138 in order to perform a garbage collection function.

Applications running on the host 110 generate commands for the SSD 120 to access data stored in the NAND memory 140 or to revamp utilization of the NAND memory 140. Such commands may be read, write, format and/or deallocate commands. In order to access specific portions of the NAND memory 140, the host commands contain addressing information which the SSD 120 uses to furnish the request from the host 110. The addressing information provided by the host 110 is with respect to Logical Block Address (LBA) within the SSD. In instances where the host command is a format command, a particular namespace or the entire drive to be formatted may be specified by the host. The host 110 sends the command to the SSD 120 via a host submission queue. When the host commands are received by the SSD 120, the SoC controller 130 retrieves the LBAs belonging to the namespace and maps the LBA to a linear Logical Cluster Address (LCA). Such mapping is performed by the L2P engine 134 and MTHA 137 as shown in FIG. 1. In some implementations, the mapping from LBA to LCA is performed algorithmically using a predetermined formula and/or look up tables.

Certain host commands, such as format, are directed to at least one namespace, or all the namespaces, in the SSD. A namespace comprises a plurality of namespace allocation units (NSAUs). In turn, each NSAU comprises a plurality of zones, and each zone comprises a plurality of regions, where each region comprises a plurality of MCAs. It should also be noted that certain SSDs are organized in superblocks, where a superblock spans a block across all the dies in the memory. Table 1 illustrates the number of NSAUs, regions, and zones in a drive. As can be seen, the number of NSAUs in a drive is fixed. Further, the SSD may maintain a namespace table to keep track of which NSAUs in a drive belong to a namespace (each having a namespace identifier NSID). In some implementations, the allocation of NSAUs to NSIDs is determined by the controller 130 and/or the firmware. An exemplary namespace allocation table is shown in Table 2. As can be seen, certain namespaces may have a discontinuity in NSAUs (such as namespaces having NSIDs 1 and 2 in Table 2). Such discontinuities may be due to namespace resizing (additions or deletion, followed by re-ordering according to NSID).

TABLE 1

Number of NSAUs, regions and zones in a drive.

| Drive Capacity | 1 TB | 2 TB | 4 TB | 8 TB | 16 TB | 32 TB |
|---|---|---|---|---|---|---|
| Number of NSAUs | 1820 | 1820 | 1820 | 1820 | 1820 | 1820 |
| Number of regions per NSAU | 2048 | 4096 | 8192 | 16384 | 32768 | 65536 |
| Number of zones per NSAU | 2 | 4 | 8 | 16 | 32 | 64 |
| Total number of regions | 3727360 | 7454720 | 14909440 | 29808880 | 59637760 | 119275520 |

TABLE 2

Exemplary namespace allocation table.

| NSID | NSAUs |
|---|---|
| 1 | 1, 2, 3, 10, 11 (NSAU discontinuity exists in namespace) |
| 2 | 4, 5, 6, 7, 8, 9, 12 (NSAU discontinuity exists in namespace) |
| 3 | 13, 14, 15, 16, 17, 18, 19, 20 (continuous NSAU in namespace) |
| . | . |
| . | . |
| . | . |
| 32 | 1000, 1001, 1002. . .1500 (continuous NSAU in namespace) |

After the LCA is determined, the L2P engine 134 maps the LCA to a physical location in the NAND memory 140. Each physical location in the NAND memory 140 is defined by a Media Cluster Address (MCA). The length of the MCA depends on the capacity of the SSD 120 (e.g. 33 bits for a 16 TB SSD). Storage of data in the NAND memory array 140 may not be in any particular order, and so there may not be any pre-determined or algorithmic relationship between the LCA and the MCA in SSD 120. The mapping of LCA to MCA is therefore done by accessing mapping tables (e.g. the LCA-MCA mapping table, MRAT and MZAT) stored in the DRAM 150, but the mapping are not fixed and may be changed by updating their entries. The mapping tables stored in the DRAM 150 are working copies of master mapping tables stored in the NAND memory array 140. The LCA is used to index into the respective mapping tables to find the MCA entry and for efficiency there is a fixed, algorithmic way to quickly derive the index of an entry in the mapping table from the LCA, which implies the entries are preferably of a common size. However, the value of the common size may vary according to the storage size of the NAND memory array 140. In some implementations, the MCA-LCA mapping table is very large and may be approximately 1/1000th the size of the NAND memory 140, while the MRAT and MZAT are considerably smaller due to the granularity of the regions and zones relative to the raw MCA-LCA entries.

The entries of each mapping table region in the DRAM 150 are arranged in order according to LCA, but the mapping table regions themselves do not need to be stored in order in the NAND memory 140. Processing of commands from the host 110, which may over-write existing data, as well as internal processes such as garbage collection within the SSD 120, may result in the need for reallocation of data stored in the NAND memory 140. Such processes may result in a change in MCA address associated with an LCA in a host command, thereby leading to frequent updates to the mapping table in the DRAM 150 during operation of the SSD 120. The mapping table entries are also updated when a format or deallocate command is sent by the host for a namespace or for a range of LCAs of a namespace, respectively. In response to the format or deallocate command, the controller unmaps or invalidates the corresponding regions or zones of the mapping table. The mapping table is therefore continually updated when the host commands or activities like garbage collection are processed by the SSD 120.

However as the DRAM 150 is a volatile memory, when the power supplied to the SSD 120 is removed, e.g. when the SSD 120 is shut down, the contents of the DRAM 150 are lost. This is disadvantageous as the mapping table would no longer be available to map an LCA address received from a host to a physical MCA address within the NAND memory 140, thereby leading to errors when processing host commands. Further, due to the large size of the mapping table in the DRAM 150, copying the entire mapping table to another portion of the SSD 120, such as to a portion of the NAND memory 140, may not be possible in the short time from when the power is removed from the SSD 120 to when data is lost from the DRAM 150.

Figure 2:
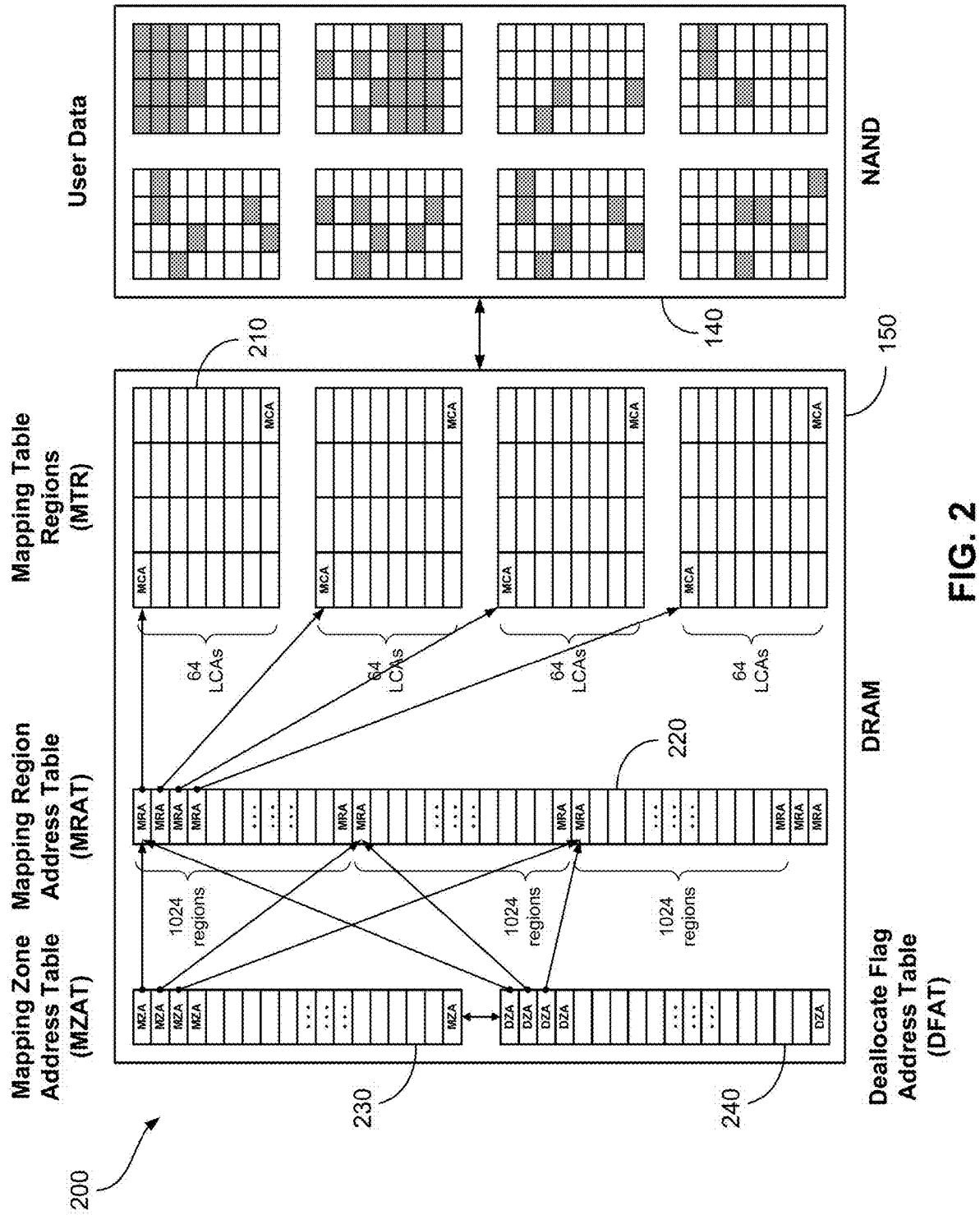
FIG. 2 illustrates the mapping table data structures in the SSD of FIG. 1, according to one or more embodiments of the present disclosure.

FIG. 2 shows the mapping table data structures 200 used during the operation of the SSD, according to an embodiment of the present disclosure. The physical addresses (MCAs) of the NAND memory 140 are shown in FIG. 2, where the NAND memory 140 is grouped in NAND pages. Valid user data is exemplified in the shaded cells, and not all the NAND memory cells contain valid user data. The mapping table 210 is the LCA-MCA mapping table as previously described in relation to FIG. 1. The mapping table 210 may be divided into regions of LCAs, such as, for example, 64 LCAs. Each region is populated with pointers to the physical addresses (MCAs) of the NAND memory cells in the NAND devices. The size of each MCA address is 4 bytes and so the size of each region is 256 bytes. Since each MCA points to 4 KB of user data, each region represents 256 KB of user data. The allocation of NAND cells to the different LCAs of the mapping table 210 may be allocated by the controller.

When all the LCAs in the mapping table region contain pointers to user data stored in the NAND memory 140, all the LCAs in the region will contain valid physical addresses of the respective NAND memory cells containing said user data. However NAND memory cells which have been deallocated, formatted or recently erased will not contain any user data. Such NAND memory cells are left unmapped in the mapping table 210, and the LCA pointers stored in the mapping table 210 for these unmapped NAND memory cells will point to an invalid signature address. The invalid signature address is predetermined by the controller firmware, and may be the same throughout the SSD 120. As such the pointers in the mapping table 210 may point to valid addresses in the NAND memory 140 or to the invalid signature address. Thus the various regions or zones in the mapping table 210 may be populated (i) entirely with valid NAND addresses (in the case where the pointers point to user data stored in the NAND memory 140), (ii) entirely with invalid signature addresses (in the case where the LCAs are unmapped and contain no user data), or (iii) may be a mix of (i) and (ii). It should be noted that currently when a format or deallocate command is received from a host, the controller may send a deallocation status completion to the host while utilizing the deallocate flag bitmap DFB to manage the processing of the deallocation of the mapping table entry in the background within the SSD.

Each region of the LCA-MCA mapping table 210 is assigned a physical address in the NAND memory, termed a media region address (MRA), where the regions were last saved in the NAND during mapping table flush. As shown in FIG. 2, the SSD controller 130 maintains a mapping region address table (MRAT) 220 which contains the MRA of each region of the mapping table 210. The MRAT 220 is therefore a mapping table that is populated with pointers to the physical address for each region of the LCA-MCA mapping table 210. In order to distinguish between regions in the mapping table 210 that are deallocated by the host but yet unmapped and regions which are already unmapped or contain at least one valid mapped NAND address, the controller 130 may maintain a DFB for each region of the mapping table 210. Further, the SSD controller 130 may organize groups of regions as zones, where each zone corresponds to the addresses of 1024 regions. Here the controller may maintain a media zone address table (MZAT) 230 which contains entries corresponding to media zone addresses (MZAs) of each group of 1024 region addresses, as shown in FIG. 2. Each MZA may comprise the media address where each group of 1024 region addresses are stored in the NAND memory 140. As with the MRAT, the controller 130 may maintain a table of media zone addresses for each zone in the MZAT 230.

Along with the MZAT and MRAT, the controller 130 also maintains the DFB. The DFB comprises a pair of bits for each region, the status of which represents the background deallocation status of the regions in the mapping table 210. The bit values indicates whether the respective region in the mapping table 210 needs to be unmapped through background deallocation or not. If the region needs to be unmapped then the bits for each region are set to '11', and if the region is already unmapped through background deallocation or has been written with valid data, the bits are cleared to '00'. If the region is being unmapped through background deallocation, the status of the pair of bits is set to '01' for the region. The controller 130 stores the addresses of each DFB zone, termed the DFB zone address (DZA) in a deallocate flag address table (DFAT) 240 which is stored in the DRAM 150 for quick access. Since each entry contains the addresses of the DFB of 1024 regions, the size of the DFAT 240 is significantly smaller than the size of the drive by a proportion of 1 entry (4 bytes) versus 1024×256 KB. Table 3 provides the relative sizes of the DFB in relation to the LCA-MCA mapping table 210 and the drive capacity.

TABLE 3

Size of DFB and Mapping Table.

| Drive Capacity | Size of Mapping Table | Size of DFB |
| --- | --- | --- |
| 1 TB | 1 GB | 1 MB |
| 2 TB | 2 GB | 2 MB |
| 4 TB | 4 GB | 4 MB |
| 8 TB | 8 GB | 8 MB |
| 16 TB | 16 GB | 16 MB |
| 32 TB | 32 GB | 32 MB |

With respect to the hierarchical mapping table shown in FIG. 2, the MZAT 230 uses one entry to indicate if the zone is mapped or unmapped, the write amplification to the NAND memory 140 is also significantly reduced for unmapped regions. Consequently, the time for loading of an LCA-MCA mapping table 210 from the NAND memory devices 140 to the DRAM 150 will also be decreased. Further, the write amplification for the unmapped zones will also decrease by saving only the mapped dirty zones to the NAND as indicated by the MZAT 230 instead of saving all dirty tables when flushing the mapping table to the NAND. This will provide significant reduction in write amplification and boot up time after power cycle during workloads containing a format command. Invalidating the MZAT 230 and DFAT 240 addresses will also significantly increase sequential and random write I/O per second (IOPS) after a format command is received during a write operation by not writing the unmapped zones and unmapped regions of the mapping table, and formatted zones of the DFB, to the NAND devices 140 during regular metadata journaling.

Currently, when a host requires a namespace in an SSD to be formatted, it issues a command specifying the namespace. The controller 130 then determines the head and tail regions of the namespace and unmaps the corresponding regions in the LCA-MCA mapping table using an internal special update command. The controller 130 then sets the DFBs associated with the regions of the remaining LCAs associated with the namespace, and a format command completion signal is sent to the host. It should be noted that even though a format completion signal is sent to the host, the actual formatting of the namespace in the drive occurs in the background after the format completion signal is sent to the host. Here, before unmapping the remaining regions of mapping table corresponding to the namespace, DFBs are used as placeholders to store the formatted (or deallocated) status of the corresponding regions. In the background, the DFBs are periodically checked and if set, the corresponding LCAs of the regions in the mapping table are unmapped using the special update command, and then the corresponding DFBs are cleared. The mapping table regions are also unmapped and the associated DFBs cleared, before processing a write or compare command that falls on the same region.

During execution of the special update command, the MCAs corresponding to the LCAs in the namespace to be formatted are set to a plurality of invalid addresses, such as 0xFFFFFFFF, for example. The controller 130 also decrements the valid cluster count (VCC) value of the superblock to correspond to the number of remaining MCAs containing valid addresses. It has been shown that the execution of a special update in each region containing 64 LCAs takes approximately 32 µs. Thus, formatting an entire 1 TB drive will take approximately 2 mins of idle time. As shown in the exemplary figures in Table 4, the background format time increases proportionately with drive capacity. Since the background deallocation process happens in the idle time of the SSD so that it does not interfere with incoming write commands that are of higher priority, idle trim is issued one region at a time. The background deallocation process also adds a firmware and microprocessor code overhead to the execution of special update commands during formatting of a namespace in the background. Based on an assumed 20% overhead due to firmware and microprocessor code, the total time taken by a special update command during a background deallocation operation is approximately 38 µs.

TABLE 4

Total time for background format of a drive.

| Drive Capacity | 1 TB | 2 TB | 4 TB | 8 TB | 16 TB | 32 TB |
|---|---|---|---|---|---|---|
| Total number of regions | 3727360 | 7454720 | 14909440 | 29808880 | 59637760 | 119275520 |
| Total time for background format | 2.36 min | 4.72 min | 9.44 min | 18.88 min | 37.77 min | 75.54 min |

However there are several issues with the current handling of a format command. As can be seen from Table 4, the total time for formatting the entire drive increases drastically with drive capacity. This is particularly problematic for data center drives of high capacity where large idle times have to be provided when a format command is being executed on an SSD drive. Further, the large amounts of time to format the drive also increases the time for pre-conditioning the drive after a format command because all the LCAs of the SSD needs to be written at least once to nullify the latency and performance impact of background formatting. For example, using a pre-conditioning with a random write, at a sustained throughput of 100K I/O per second, a pre-conditioning time of approximately 5.28 hours would be required to write an entire 8 TB drive.

Additionally, with the current formatting methodology, the Namespace Utilization (NUSE) parameter of the SSD would not be accurately reflected due to the disconnect and delay between notifying the host of completion of formatting, and the actual completion of the execution of the format command in the background. NUSE is dependent the VCC of the namespace. Thus the delay in reflecting the actual NUSE value can be very misleading particularly in concentrated write intensive workloads. Further, the current formatting methodology would also increase the write latency after a format command since all the DFB regions which are set to '11' by the format command needs to be formatted in the background (i.e. unmapped by the special update command) and also needs to be written to the NAND during a flush from the volatile memory.

If there is a power loss (PLP) event after execution of a format command, the time to achieve full throughput (TTR12) increases significantly during PLP boot up. This is because the background deallocation information is not stored during PLP after the last flush to NAND. Thus, the background formatting that was performed after the last flush to NAND would have to be repeated upon boot up following the PLP event. It should be noted that the Open Compute Project (OCP) specification (https://www.opencompute.org/) stipulates that TTR12 should be within 120s. However with the current formatting methodology, if a format command is issued just before or after the last flush to NAND prior to a PLP event, the TTR12 time can increase to in excess of 1 hr 15 mins for a 32 TB drive, and beyond for higher capacity drives, due to the impact on performance and latency impact by background deallocation. This also results in an update of the VCC of the superblocks after 1 hour 15 mins of idle time for a 32 TB drive, or after a write command is issued to the regions. As such during garbage collection after a format command to a namespace, incorrect superblocks are selected as the source block for garbage collection, leading to ineffective execution of garbage collection in the SSD, further compounding the unnecessary write amplification of the drive.

The current formatting methodology of executing the format command in the background makes the entire mapping table dirty and hence the all the formatted mapping table regions and zones need to be written to the NAND, thereby causing unnecessary write amplification and NAND wear. Additionally, the entire DFB bitmap associated with the regions of the namespace being formatted also needs to be written to the NAND during flush after completion of the format command, thereby increasing write amplification.

Additionally, after PLP boot after a sudden power loss event, the user data written by the host after the last mapping table flush would need to be replayed. During replay if the write commands fall on the trimmed regions of a formatted namespace, the namespace would require a special update (32 µs per region) for each region, leading to increased time to ready (TTR2) during the PLP boot up procedure. Using the current formatting methodology, TTR2 after a PLP boot is increased by several seconds due to the format command.

Still further, the current formatting methodology requires the use of NAND blocks as deallocation (DA) buffers. The DA buffers are used to store the format command address range to maintain coherency with prior and post write commands where the DA buffer is used during PLP replay to reconstruct the format command in coherence with other write commands. The reliance on the DA buffer reduces the user data overprovisioning (OP) space of the SSD. Additionally, as DA buffers are saved in triple-level cell (TLC) blocks which are error prone, format command recovery after a PLP boot up is less likely to occur correctly. Further, saving the DA buffer during a PLP event (as required for execution of format commands) consumes the backup power provided by on-board capacitors, which is reserved for sudden power loss events.

In accordance with an embodiment of the present disclosure, a copy command is used instead of an internal special update command during execution of a formatting command received from a host. As previously noted, the special update takes approximately 32 μs (this becomes approximately 38 μs when overheads are included). Comparatively, the execution of copy command with read modify write (RmW) disabled is approximately 298K regions/sec, i.e. approximately 3.35 μs/region. Thus the copy command is more than 11 times faster than the special update command. Since namespaces are allocated in the granularity of NSAUs, and each NSAU is at least 2048 regions (e.g. for 1 TB drive), a copy operation with RmW disabled can be executed for all the regions of the namespace associated with a host format command, except the last region in the NSAU if, in the rare scenario, the next NSAU is not continuous. If the next NSAU is continuous, as in most real world cases, the copy operation with RmW disabled will be executed for all regions in the namespace until a discontinuous NSAU is encountered. The execution of copy command with read modify write (RmW) enabled is approximately 159K regions/sec, i.e. approximately 6.29 μs/region, which is still more than 6 times faster than the special update command. Exemplary total time to format a namespace with copy operation are provided in Table 5.

Figure 3:
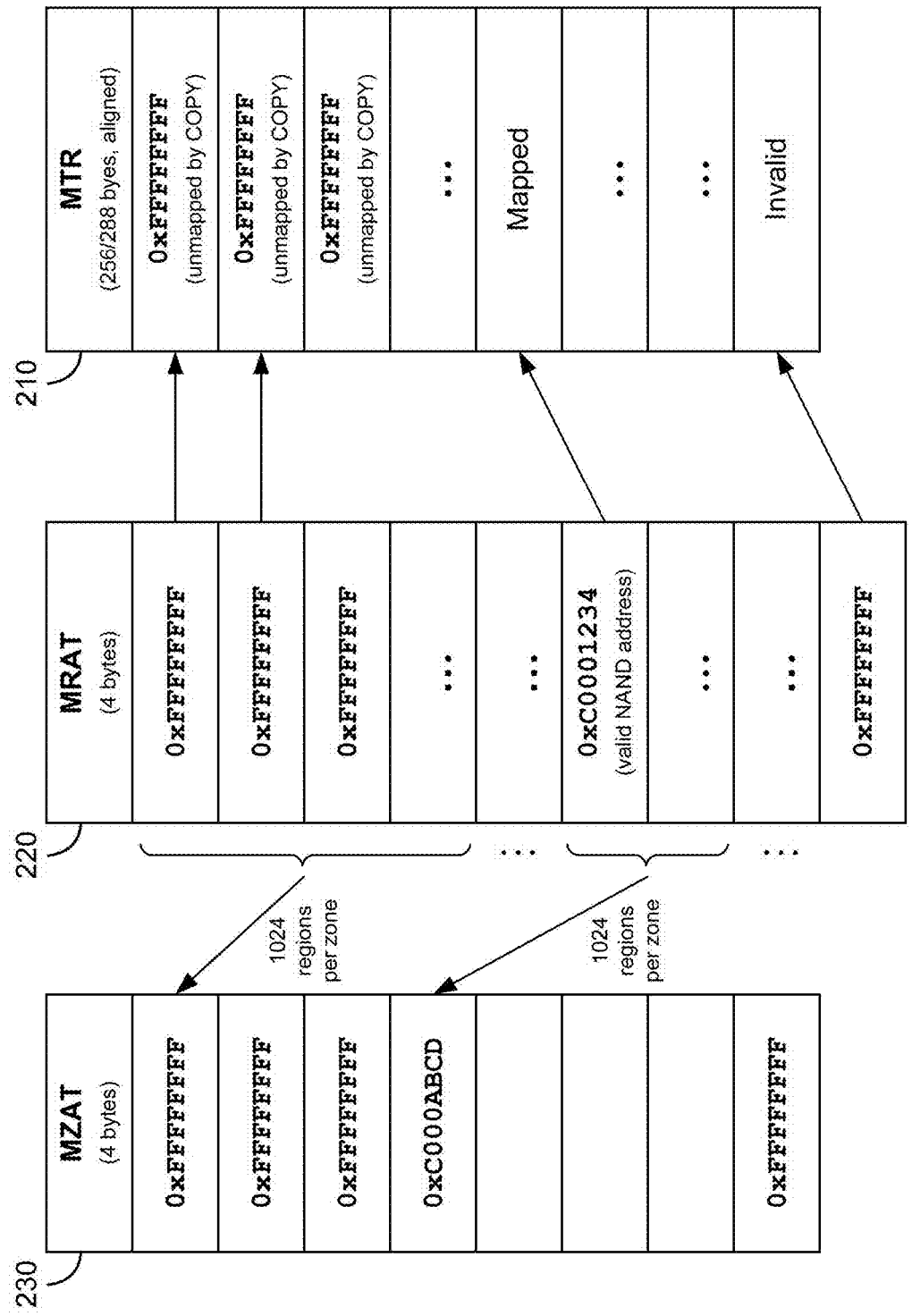
FIG. 3 illustrates the contents of the mapping table data structures of FIG. 2 during processing of a format command by the SSD in FIG. 1, according to one or more embodiments of the present disclosure.

MRAT 220 belonging to the namespace and unmaps them, i.e. the addresses of the entries in the MRAT 220 belonging to the namespace is set to the invalid address 0xFFFFFFFF, as shown in FIG. 3. A dummy region (256 or 288 bytes) in the aligned section of the DRAM is then selected and is unmapped using a memset operation. The unmapped dummy region is then copied to all the regions of the namespace in the mapping table consecutively. If there is a discontinuity in the NSAUs of the namespace, the copying is done using RmW disabled until the discontinuity is encountered. The invalid addresses are then copied to the region in the mapping table corresponding to the discontinuity using RmW enabled. The invalid addresses are also set in the corresponding entries in the MZAT 230 belonging to the namespace to be formatted. Once format command is completed (approximately 6.66 mins for a 32 TB drive), the entire drive will be unmapped and the NUSE will show 0% utilization, unlike the current conventional formatting methodology which requires in excess of 1 hr 15 mins of idle time (for a 32 TB drive) to be updated.

As previously described, certain SSDs are organized in superblocks, where a superblock spans a block across all the dies in the NAND memory, and the valid cluster count

TABLE 5

Total time to format entire drive with copy operation.

| Drive Capacity | 1 TB | 2 TB | 4 TB | 8 TB | 16 TB | 32 TB |
|---|---|---|---|---|---|---|
| Number of NSAU | 1820 | 1820 | 1820 | 1820 | 1820 | 1820 |
| Copy time with RmW Enabled (in μs) | 6.29 | 6.29 | 6.29 | 6.29 | 6.29 | 6.29 |
| Copy time with RmW Disabled (in μs) | 3.35 | 3.35 | 3.35 | 3.35 | 3.35 | 3.35 |
| Number of regions per NSAU | 2048 | 4096 | 8192 | 16384 | 32768 | 65536 |
| Size of each region (in KB) | 256 | 256 | 256 | 256 | 256 | 256 |
| Number of max discontinuous NSAU | 910 | 910 | 910 | 910 | 910 | 910 |
| Size of each NSAU (in GB) | 0.5 | 1 | 2 | 4 | 8 | 16 |
| Size of namespace with max discontinuous NSAU (in TB) | 0.5 | 1 | 2 | 4 | 8 | 16 |
| Time to format 1 NSAU using COPY | 0.013 | 0.02 | 0.034 | 0.061 | 0.116 | 0.226 |
| Time to format 1 namespace (in sec) | 11.83 | 18.2 | 30.94 | 55.51 | 105.36 | 205.66 |

As can be seen from Table 5, the theoretical worst case scenario of formatting a 16 TB namespace in a 32 TB drive using the copy command is approximately 205.66 sec (3.43 mins). Comparatively, the theoretical worst case scenario of formatting a 16 TB namespace (all discontinuous NSAU) in a 32 TB drive using the conventional special update command is 38 μs×910×65536=37.77 mins, which is in excess of 11 times slower. The present invention thus makes the time to format the drive 11 times faster than the conventional method.

According to an embodiment of the present disclosure, because the use of the copy command results in faster formatting of a namespace, the format operation can be performed in the foreground rather than in the background as is currently the case. In order to facilitate the processing of a format command as received from a host, the controller 130 identifies the corresponding LCA range corresponding to the namespace as specified by the host in the format command. The controller 130 then selects the entries in the (VCC) of the superblock corresponds to the number of MCAs containing valid addresses in the superblock. According to an embodiment of the present disclosure, because formatting of the namespace is carried out in the foreground, the VCC of the superblock will also be updated in the foreground when the format command is processed. Because the superblock with the minimum VCC is selected for garbage collection in the SSD, the processing of a format command in the foreground ensures that garbage collection design can make the right decision when selecting the superblock with minimum VCC for recycling after a format command. According to an embodiment of the present disclosure, each superblock will have a VCC for each NS. The VCC of the superblock will be the sum of the count of all the namespaces residing in the superblock:

$$\text{VCC(superblock } n) = \text{VCC\_NS1} + \text{NCC\_NS2} + \text{VCC\_NS3} + \ldots + \text{VCC\_NS32}, \quad (1)$$

where VCC_NSx is the VCC of the x-th namespace in superblock n. During the handling of a format command, the VCC of the namespace will be set to 0 for each superblock.

This will update the overall VCC of all the superblocks of the SSD. For example, if namespace NS1 has been formatted, the VCC for the respective superblocks are as follows:

$$VCC(\text{superblock } n) = 0 + NCC\_NS2 + VCC\_NS3 + \ldots + VCC\_NS32, \text{ and} \quad (2)$$

$$VCC(\text{superblock } n+1) = 0 + NCC\_NS2 + VCC\_NS3 + \ldots + VCC\_NS32. \quad (3)$$

Thus, according to an embodiment of the present disclosure, the VCC table for the SSD will be increased to a two dimensional table to include VCC per namespace per superblock, as shown in Table 6. The VCC table will be saved to the NAND memory during a flush operation, so that VCC per namespace per superblock can be restored across a power cycle. As exemplary theoretical statistics, the maximum number of superblocks supported in the NAND memory is 1958 (rounded up to 2048). The size of each entry in the VCC table is 3 bytes. Therefore the maximum size of the VCC table for each namespace is 2048×3 bytes=6 KB. Thus, the maximum size of the 2D VCC table for 32 namespaces is 192 KB. This is a very small footprint compared to several megabytes of Metadata Tables that are written during flush (without DFB tables, in the best case scenario at least 2 banks (1 MB) of metadata is written during flush), where each bank represents 1 die across all the channels. So for a 16 channel configuration, 2 banks in pSLC block=page size×number of planes×number of channels×number of banks=16 KB×2×16×2=1 MB. The mapping tables are written in pSLC blocks in the NAND memory 140 to maintain higher reliability.

TABLE 6

Two Dimensional VCC Table.

| | VCC_NS1 | VCC_NS2 | ... | VCC_NS16 | VCC_NS32 |
|---|---|---|---|---|---|
| VCC (superblock 1) | ... | ... | ... | ... | ... |
| VCC (superblock 2) | ... | ... | ... | ... | ... |
| . | | | | | |
| . | | | | | |
| VCC (superblock n) | ... | ... | ... | ... | ... |

According to an embodiment of the present disclosure, in order to avoid write amplification by writing the entire mapping table to the NAND during flush, the DFBs associated with the unmapped regions are cleared to '00', and the status of the DFB zones associated with the corresponding entries of the DFAT table 240 are not set to dirty. Since the regions corresponding to the namespace are all unmapped and do not contain any useful information, the entries (i.e. the region addresses) in the MRAT 220 corresponding to the invalid regions are also unmapped. We also do not set the zones of the regions addresses to dirty to avoid write amplification of writing addresses of all the unmapped regions in MRAT 220 with invalid address 0xFFFFFFFF. Instead since NSAU comprises a multiple of zones, we unmap the corresponding zone addresses in the MZAT 230 with invalid address 0xFFFFFFFF.

Further, in order to avoid unnecessary background trim which lowers performance of write commands, according to an embodiment of the present disclosure, since the unmapping of the formatted regions are already done in the foreground, the DFBs belonging to the namespace are reset to all zeros as part of a format command. However, the DFB zones are not set to dirty to avoid extra writing of several megabytes of all 0-bit zones to the NAND memory during flush. Instead, the DFAT 240 entries corresponding to the formatted zones are also unmapped. Since NSAU comprises a multiple of zones, all the DFAT 240 zones belonging to the namespace subject to the format command are unmapped.

According to yet another embodiment of the present disclosure, after unmapping the corresponding regions using the copy command, clearing the DFB and invalidating the corresponding entries of the root tables MRAT 220, MZAT 230 and DFAT 240, the controller 130 issues an internal standby flush to the NAND memory 140. The internal standby flush writes the unmapped entries of the MZAT 230 and DFAT 240 to the NAND memory 140 to ensure that all unmapped zones, unmapped regions and all 0-bit DFB zones are not loaded after the power cycle following completion of the format command, leading to reduction in TTR2. Internal standby flush without the unmapped regions, unmapped zones and 0-bits DFB sections will add negligible extra latency to the processing of the format command.

The internal standby flush issued by the controller at the end of the format command also saves the hierarchical non-volatile mapping tables in the NAND memory in pseudo single-level cell (pSLC) NAND blocks. This means that the DA buffers in the user data blocks are no longer needed to save the format command information in coherence with the write commands, thus maximizing the blocks for actual user data. In the case of conventional drives, DA buffers comprising at least 3 MB for a 16 channel, 2 plane, 2 bank programming sequence are required in conventional memories. However according to an embodiment of the present disclosure, if a drive does not need to support deterministic trim, the DA buffers can be made redundant, thereby saving on back up secondary power of on-board capacitors.

Unmapping the MZAT 230 and DFAT 240 ensures that the restoration of the format command is included as part of the restoration of the mapping table and DFB, and no additional time is added to TTR2 (time to ready and accept I/O commands) or TTR12 (time to achieve full I/O throughput) for format command restoration during boot up following a power cycle after the format command is completed. The TTR2 and TTR12 after boot is significantly reduced for table loading if there is a format command prior to the power cycle since the unmapped regions and unmapped DFB sections (being already invalidated/unmapped as part of initialization) are not required to be loaded during boot up where only regions in the MRAT 220 having valid NAND addresses will be loaded from the NAND memory 140.

According to an embodiment of the present disclosure, background deallocation (32 per region) is no longer needed for formatted regions. This improves the performance of write commands significantly when executed after a format command. Performance it also improved since the controller does not need to write to NAND the unmapped/formatted regions during regular table saving. The latency of the write commands is also improved since the controller does not need to write the formatted regions and associated DFBs during flush.

Further, according to an embodiment of the present disclosure, since the format command information is stored in more reliable pSLC blocks by a smaller footprint internal stand flush, instead of less reliable TLC open blocks, recovery of all format commands after a PLP is more reliable. In a worst of case of discontinuous NSAUs, there can be a maximum of 1820/2=910 LCA ranges per format command.

According to the conventional designs, a total number of four DA buffers are required per format command in a multi-namespace environment (910/256=4), and these four DA buffers have to be saved in user data blocks. Thus, by eliminating the need for any DA buffers when processing a format command, the present disclosure eliminates any encroachment into user data block by the format command, thereby saving Overprovisioning (OP) space within the NAND memory 140.

Figure 4:
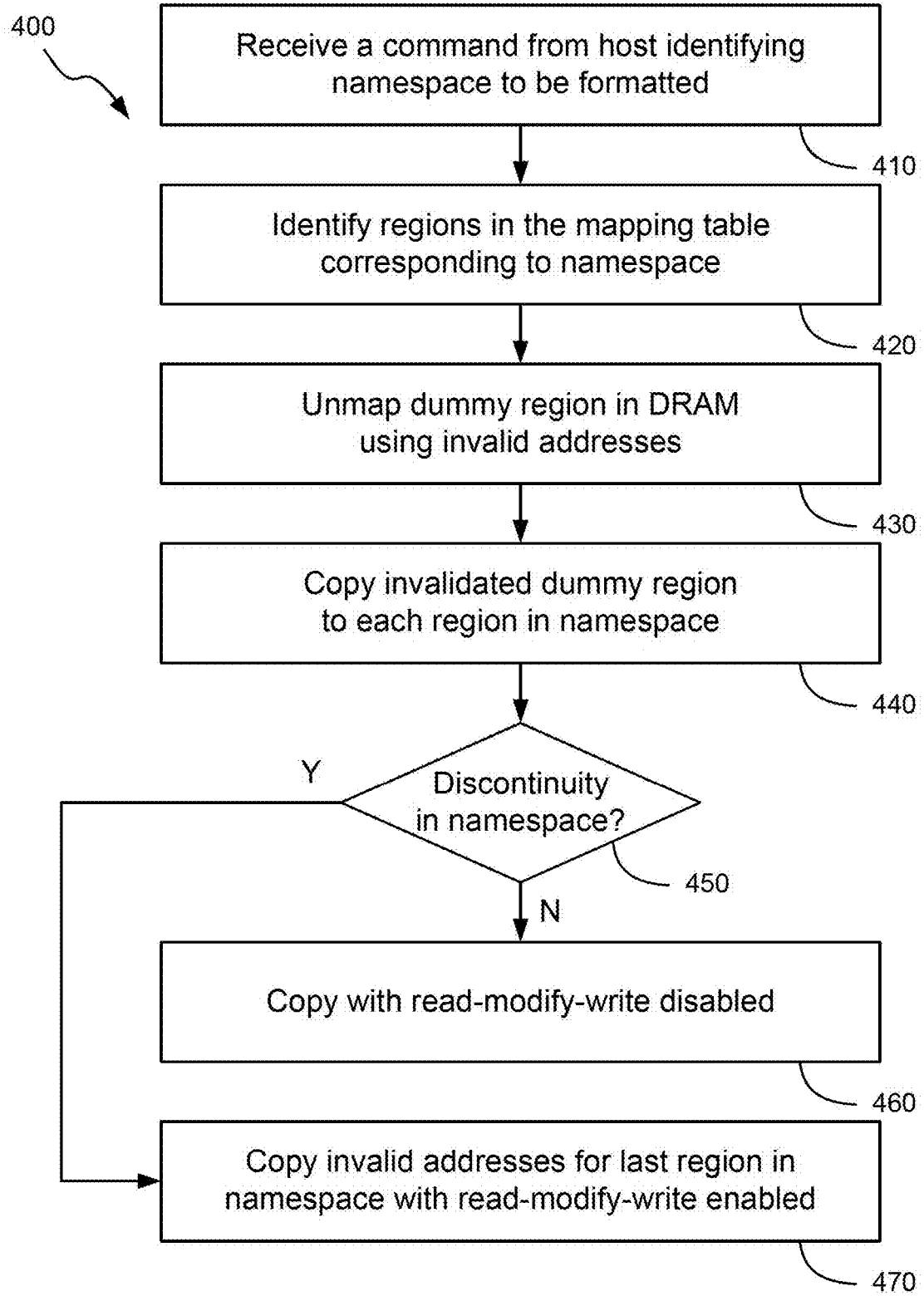
FIG. 4 is a flow diagram of a method for updating an LCA-MCA mapping table stored in a non-volatile semiconductor storage device when processing a format command, according to one or more embodiments of the present disclosure.

FIG. 4 illustrates an exemplary flow diagram of a method 400 for handling a formatting command issued by a host, according to an embodiment of the present disclosure. The method 400 may be carried out with the SSD 120 as described in the foregoing. At step 410, a format command is received from a host identifying a namespace in the NAND memory 140 to be formatted. The controller 130 then identifies a plurality of regions in the mapping table corresponding to the namespace specified in the format command (step 420). The controller 130 then selects a dummy region from the aligned section of the DRAM 150 and unmaps the region using a memset operation (step 430). The controller 130 then copies the unmapped aligned region to each region in the namespace (step 440) in the packed format, using an aligned-to-packed copy procedure, for example. In some implementations, the controller 130 determines if there is a discontinuity in the NSAUs of the namespace (step 450). If there is no discontinuity ('N' at step 450), the controller performs the copying of the invalid addresses from the aligned region to the packed region of the namespace in the mapping table with the read-modify-write function disabled, as in step 460. However, if there is a discontinuity at the end of the NSAU ('Y' at step 450), the controller copies the invalid addresses from the aligned region to the packed region of the namespace causing the discontinuity with the read-modify-write function enabled, as in step 470.

Figure 5:
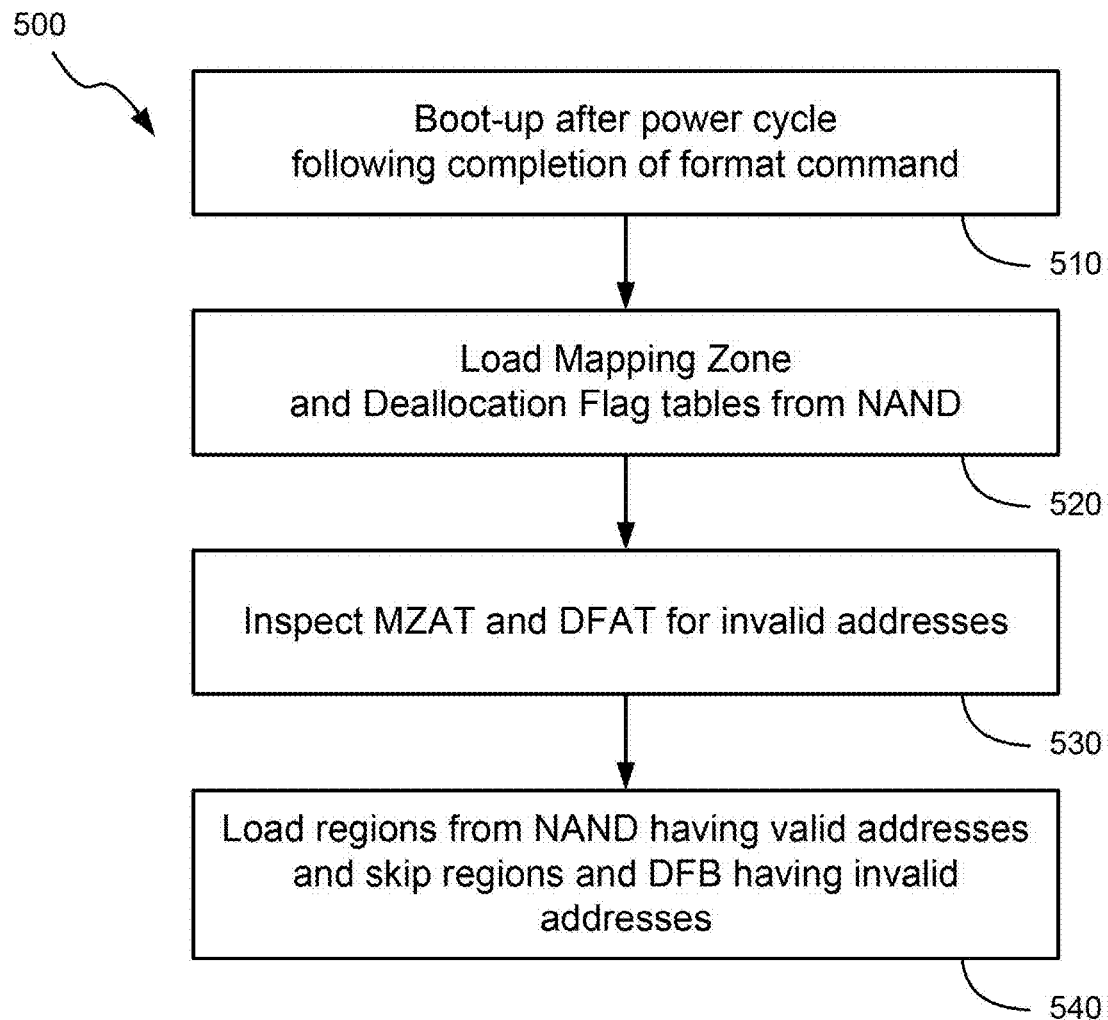
FIG. 5 is a flow diagram of a method for restoration of a mapping table during boot-up of the SSD following safe shutdown after completion of a format command.

FIG. 5 illustrates an exemplary flow diagram of a method 500 for booting-up an SSD following a power cycle after the execution of a format command, according to an embodiment of the present disclosure. The method 500 may be carried out with the SSD 120 when there is a power cycle following the completion of the handling of a format command in method 400 as described in the foregoing. Here the method begins at step 510 where the SSD 120 is boot-up after a power cycle. Upon boot-up, the controller 103 loads the MZAT 230 and DFAT 240 from the NAND device 140, as in step 520. Here the controller inspects the MZAT 230 and DFAT 240 for any invalid address entries (step 530). The controller skips entries in the MZAT 230 and DFAT 240 having invalid addresses and only loads MRAs and DFBs corresponding to valid addresses in the MZAT 230 and DFAT 240, respectively, as shown in step 540. Similarly, when loading the regions using the region addresses in MRAT 220, the controller 130 loads only the valid regions from NAND memory 140 and skips the entries with invalid MRAs.

In the foregoing, all recitation of "layer" and "engine" should be taken to mean a plurality of circuits within the controller that facilitates the function as described. Such circuits may comprise electronic components formed on a semiconductor chip, such as, for example, transistors and resistors. It should be noted that the term "about" or "approximately" in the foregoing indicates a range of ±20% of the stated value. Additionally, in the foregoing, all recitation of "command," "action" or "function" should be taken to be based on algorithms and instructions stored on a non-transitory computer-readable medium, that, when executed by a processor, causes a controller of an integrated circuit of a solid-stated drive (SSD) to perform the command, action or function. All recitation of "device," "memory," and "dies" are used interchangeably when used in relation to the NAND non-volatile semiconductor memory device. All recitation of "mapping table" and "LUT" are synonymous and are used interchangeably throughout this specification.

Other objects, advantages and embodiments of the various aspects of the present invention will be apparent to those who are skilled in the field of the invention and are within the scope of the description and the accompanying drawings. For example, but without limitation, structural or functional elements might be rearranged consistent with the present invention. Similarly, principles according to the present invention could be applied to other examples, which, even if not specifically described here in detail, would nevertheless be within the scope of the present invention.

The invention claimed is:

1. A method performed by a controller of a solid-state drive (SSD), comprising:
receiving a command from a host, the command identifying a namespace in a non-volatile semiconductor memory device of the SSD to be formatted;
identifying a plurality of regions in the non-volatile semiconductor memory device corresponding to the namespace;
unmapping a dummy region in a volatile semiconductor memory device of the SSD using invalid addresses; and
copying the invalidated dummy region to each region of the plurality of regions of the namespace.

2. The method of claim 1, further comprising:
disabling a read-modify-write operation of the controller during the copying.

3. The method of claim 2, further comprising:
determining if a discontinuity in namespace allocation units (NSAUs) comprising the namespace exists; and
copying the region corresponding to the discontinuity with the read-modify-write operation enabled if the discontinuity exists.

4. The method of claim 1, wherein the copying is performed using an aligned-to-packed copying procedure.

5. The method of claim 1, wherein unmapping the dummy region using the invalid addresses is done using a memset operation.

6. The method of claim 1, wherein the invalid addresses are predetermined.

7. The method of claim 1, further comprising:
storing in a logical to physical mapping table of the non-volatile semiconductor memory a plurality of logical cluster addresses (LCAs) corresponding to each region.

8. The method of claim 7, further comprising:
storing the logical to physical mapping table in the volatile semiconductor memory device during execution of the format command.

9. The method of claim 8, wherein the dummy region is located in an aligned portion of the volatile semiconductor memory device.

10. The method of claim 8, further comprising:
flushing regions of the logical to physical mapping table that have changed via copying to the non-volatile semiconductor memory device after the namespace is formatted.

11. The method of claim 10, further comprising:
flushing a media zone address table (MZAT) to the non-volatile semiconductor memory device after the namespace is formatted, each entry in the MZAT corresponding to a media zone address (MZA) of a zone comprising a subset of the plurality of regions within the namespace.

12. The method of claim 11, further comprising clearing a deallocate flag bitmap (DFB) associated with the namespace, the DFB comprising two bits per region, the pair of bits cleared to '00' to indicate a region which has been unmapped using the invalid addresses.

13. The method of claim 12, further comprising:
flushing a deallocated flag address table (DFAT) to the non-volatile semiconductor memory device after the namespace is formatted, each entry in the DFAT corresponding to a media zone address in the non-volatile semiconductor memory device at which the DFB for each zone is stored.

14. The method of claim 13, further comprising:
loading the MZAT and DFAT from the non-volatile semiconductor memory device into the volatile semiconductor memory device on boot-up after a power cycle following the format command;
inspecting the MZAT and DFAT for entries containing invalid addresses;
loading mapped regions of the non-volatile semiconductor memory device corresponding to MZAT entries having valid addresses into the volatile semiconductor memory device; and
skipping regions and DFBs of the non-volatile semiconductor memory device corresponding to MZAT and DFAT entries having invalid addresses.

15. The method of claim 13, further comprising:
loading mapped regions of the non-volatile semiconductor memory device corresponding to MRAT entries having valid addresses into the logical to physical address mapping table in the volatile semiconductor memory device; and
skipping regions of the non-volatile semiconductor memory device corresponding to MRAT entries having invalid addresses.

16. The method of claim 7, wherein the volatile semiconductor memory device comprises a cache memory for temporarily storing the logical to physical mapping table.

17. The method of claim 1, further comprising:
creating and storing a two dimensional valid cluster count (VCC) table per namespace per superblock for the non-volatile semiconductor memory device, the table stored in the non-volatile semiconductor memory device.

18. The method of claim 17, further comprising:
resetting the VCC for the formatted namespace to zero after completing the format command.

19. The method of claim 1, wherein the command identifies all namespaces in the non-volatile semiconductor memory device of the SSD to be formatted.

20. The method of claim 1, wherein the non-volatile semiconductor memory device is a NAND semiconductor memory.

21. The method of claim 1, wherein the volatile semiconductor memory device is a Dynamic Random Access Memory (DRAM).

22. A solid-state drive (SSD) comprising:
a non-volatile semiconductor memory device comprising a plurality of regions;
a volatile semiconductor memory device comprising a dummy region; and
a controller coupled to the non-volatile semiconductor memory device and the volatile semiconductor memory device, the controller configured to:
receive a command from a host, the command identifying a namespace in a non-volatile semiconductor memory device of the SSD to be formatted;
identify a plurality of regions in the non-volatile semiconductor memory device of the SSD corresponding to the namespace;
unmap the dummy region in the volatile semiconductor memory using invalid addresses; and
copy the invalidated dummy region to each region of the plurality of regions of the namespace.

23. The SSD of claim 22, wherein the controller is also configured to:
disable a read-modify-write operation of the controller during the copying.

24. The SSD of claim 23, wherein the controller is also configured to:
determine if a discontinuity in namespace allocation units (NSAUs) comprising the namespace exists; and
copy the region corresponding to the discontinuity with the read-modify-write operation enabled if the discontinuity exists.

25. The SSD of claim 22, wherein the dummy region is located in an aligned portion of the volatile semiconductor memory.

26. The SSD of claim 22, a plurality of logical cluster addresses (LCAs) corresponding to each region is stored in a logical to physical mapping table of the non-volatile semiconductor memory.

27. The SSD of claim 26, wherein the volatile semiconductor memory device comprises a cache memory for temporarily storing the logical to physical mapping table.

28. The SSD of claim 26, wherein the controller is also configured to:
flush mapped regions of the logical to physical mapping table that have changed to the non-volatile semiconductor memory device after the namespace is formatted.

29. The SSD of claim 22, wherein the copying is performed using an aligned-to-packed copying procedure.

30. The SSD of claim 22, wherein the command identifies all namespaces in the non-volatile semiconductor memory device of the SSD to be formatted.

* * * * *